United States Patent [19]

Duke

[11] Patent Number: 4,728,468
[45] Date of Patent: Mar. 1, 1988

[54] FLUID CONTACT PLATE

[76] Inventor: Eddie D. Duke, P.O. Box 276, Tenaha, Tex. 75974

[21] Appl. No.: 886,823

[22] Filed: Jul. 18, 1986

[51] Int. Cl.$^4$ ............................................. B01F 3/04
[52] U.S. Cl. .................................. 261/111; 261/112; 52/581
[58] Field of Search ................. 261/111, 112; 52/581, 52/663

[56] References Cited

U.S. PATENT DOCUMENTS

| | | | |
|---|---|---|---|
| 701,588 | 6/1902 | Liebau | 52/663 |
| 1,294,278 | 2/1919 | Jordan | 52/581 |
| 2,365,233 | 12/1944 | Wilson | 52/581 |
| 2,377,648 | 6/1945 | Prince | 52/581 |
| 2,378,645 | 6/1945 | McCue | 261/112 |
| 2,856,937 | 10/1958 | Harris | 261/29 |
| 2,971,750 | 2/1961 | Boling | 261/111 |
| 3,039,749 | 6/1962 | Kohl et al. | 261/112 |
| 3,189,335 | 6/1965 | Fuller et al. | 261/112 |
| 3,227,429 | 1/1966 | Renzi | 261/112 |
| 3,286,999 | 11/1966 | Takeda | 261/112 |
| 3,602,955 | 9/1971 | Schwartz | 52/581 |
| 3,751,017 | 8/1973 | Lemmens | 261/111 |
| 3,791,634 | 2/1974 | Phelps | 261/111 |
| 3,799,516 | 3/1974 | Furlong et al. | 261/111 |
| 4,451,411 | 5/1984 | Lefevre | 261/111 |
| 4,477,394 | 10/1984 | Armstrong et al. | 261/112 |
| 4,590,731 | 5/1986 | De Gooyer | 52/660 |

FOREIGN PATENT DOCUMENTS 1285495  8/1972  United Kingdom ............... 261/111

Primary Examiner—Tim Miles
Attorney, Agent, or Firm—John M. Harrison

[57] ABSTRACT

An extended surface fluid contact plate which includes a plurality of vertical fins oriented in parallel relationship and multiple horizontal fins, also mounted in parallel relationship, with two sets of diagonal fins interconnecting the intersecting vertical and horizontal fins at junctions to provide an extended surface fluid contact matrix.ABins project in spaced relationship from selected locations on the face of the plate and cooperating pin slots are provided in selected junctions in the back of the plate for receiving the pins, to join individual fluid contact plates together in front-to-back, vertically staggered relationship. T-connectors and cooperating T-slots are provided at the top and bottom of each fluid contact plate, respectively, in order to facilitate stacking and connecting the plates in vertical, end-to-end relationship and separate rows of fluid contact plates are aligned to provide a cooling or mass transfer medium of desired size and thickness. In a preferred embodiment, one or more screen elements are included in the fluid contact plate matrix to minimize liquid entrainment in the gas flowing through the matrix.

9 Claims, 5 Drawing Figures

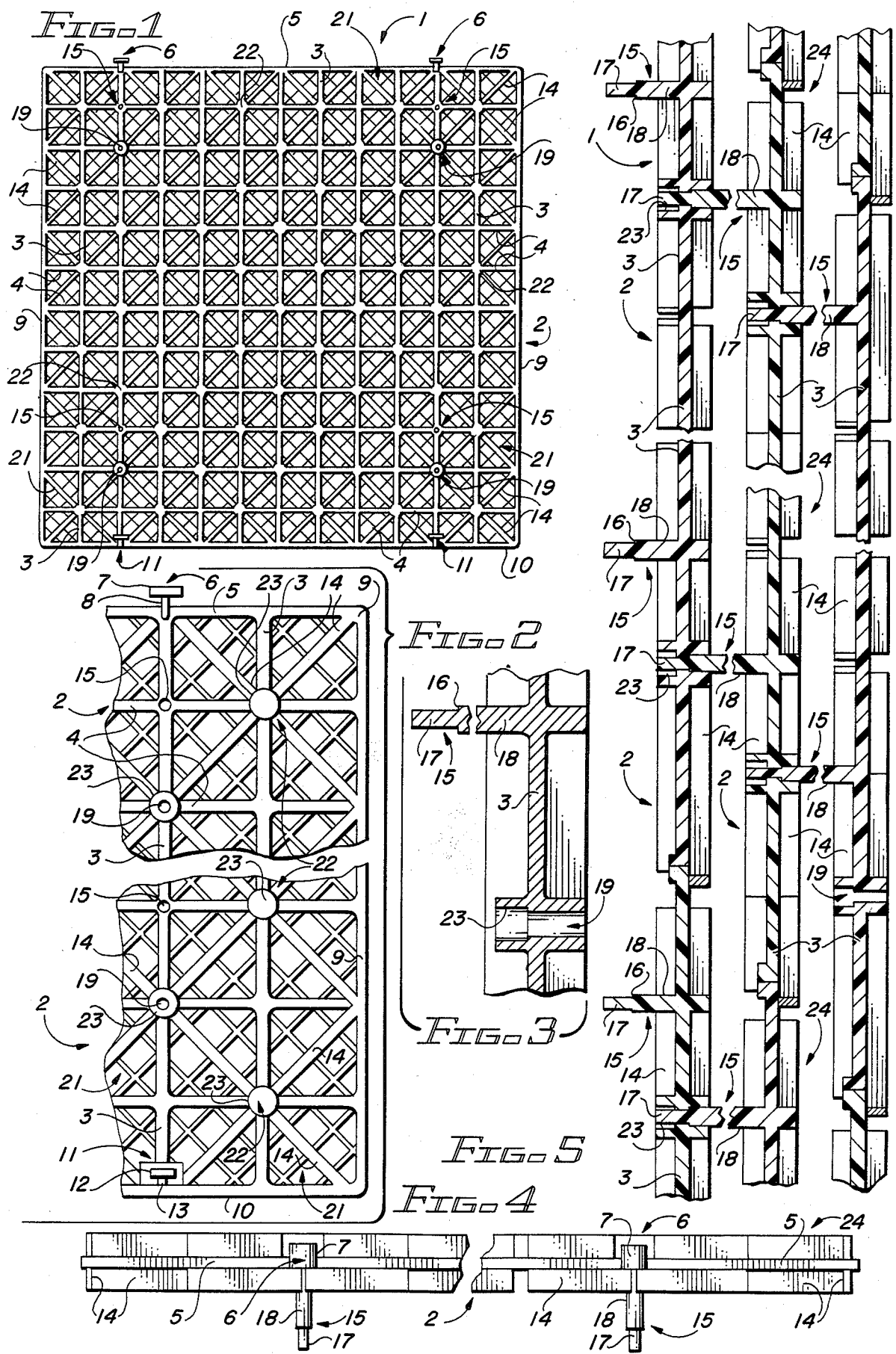

FLUID CONTACT PLATE

BACKGROUND OF THE INVENTION

1. Field of the Invention

This invention relates to fluid contacting apparatus for mass transfer and cooling operations and more particularly, to a liquid-air extended surface fluid contact medium which is defined by specially designed fluid contact plates having multiple vertical and horizontally oriented fins interconnected by diagonal fins and provided with extending pins and pin slots as well as T-connectors and T-slots, for connecting individual plates together in front-to-back and stacked relationship. The fluid contact plates are designed to distribute a falling stream of water or other liquid into a thin film in order to provide an extended liquid surface for air or alternative fluid contact with the liquid in cooling or mass transfer operations. The fluid contact is used in such applications as cooling towers, absorption towers, stripping units, cooling units for poultry houses and greenhouses and other equipment for interfacing gases and liquids and in a preferred embodiment, for the evaporative cooling of air by contact with water. The fluid contact plate of this invention is characterized by an inert material of construction, a high void volume which effects a low resistance to the flow of water or other cooling fluid, a large surface area per unit of volume and a low density, in order to provide an extensive contact matrix surface with minimum weight.

The fluid contact plate of this invention is particularly well suited for use in cooling poultry houses and greenhouses where a primary problem associated with growing large numbers of chickens, turkeys and other poultry, as well as flowers and vegetables such as tomatoes, is that of maintaining a suitably cool temperature in the protective structures during hot weather. Poultry such as chickens and turkeys are sensitive to heat and large poultry losses have been experienced in commercial poultry houses in hot summer weather. Furthermore, the blooms on certain vegetables such as tomatoes will not "set" at temperature above about 80° F. Greenhouses and poultry houses are typically cooled by large exhaust fans located in one end of the structure for circulating air through screened openings at the opposite end and cooling the interior of the structure to a desired temperature level. However, in the heat of the summer, these fans will only reduce the temperature in the structure to a level which is determined by the air temperature outside the structure and additional cooling is frequently necessary to reduce the temperature in the structure to an acceptable level. This additional cooling is normally provided by installing cooling panels across the screened openings in one end of the structure, which panels are designed with wafer-like contact elements that are saturated with water in order to provide an evaporative contact surface to cool the air circulated through the panels by the exhaust fans. In a typical installation these panels are fabricated of paper and are corrugated and wafered in order to present maximum contact surface area to the air current for evaporative cooling purposes. The panels are manufactured in selected sizes and are typically placed in a supporting rack to facilitate wetting the panels by a discharge of water through a distribution header located above the panels and attached to the rack. The water which remains after evaporative cooling is then collected to a trough sump or drain system and is returned to a sump pump or is pumped directly from the receiving trough or pipe back through the distribution header.

2. Description of the Prior Art

Various apparatus are known in the art for providing gas-liquid contact for the purpose of cooling a gas, such as in cooling towers and in other unit operations where it is necessary or desirable to expose a large liquid area in a small volume or in a short distance. Of the prior art devices designed to effect such liquid-gas contact, among the most efficient are the corrugated contact structures which are constructed of a plastic or paper material, which structures achieve a desirable weight reduction and satisfy necessary high void volume and large surface area requirements. However, problems have been experienced with many of these prior art devices, in that the falling liquid tends to "channel" or flow in streams across the textured contact surfaces, rather than completely wet the surfaces. This condition creates dry areas in the structure and reduces the overall contact efficiency.

Typical of the prior art fluid-contact devices is the structure disclosed in U.S. Pat. No. 2,793,017 to Douglas E. Lake, entitled "Apparatus For Distributing Falling Liquid in Thin Films". The Lake invention as embodied in this patent includes an assembly of corrugated sheet elements arranged in stacked relationship to provide an extended fluid contact surface for use in such devices as trickle filters, cooling towers, absorption towers and the like. The corrugated sheet elements are manufactured from organic thermoplastic sheet materials, including a polymer or copolymer of styrene. A similar gas-liquid contacting device is disclosed in U.S. Pat. No. 3,485,485 to Heinz Faigle, which "Cooling Screen" is characterized by a plurality of sheets having a median longitudinal axis with corrugations extending in the longitudinal direction on either side of this axis and offset from one another on either side of the longitudinal axis. When the structure is viewed transversely, the ridge of one of the corrugations is aligned with a valley of another corrugation, the ridges and valleys of the corrugations being equal. When the structure is viewed longitudinally, unimpeded passageways are formed between the adjacent sheets. U.S. Pat. No. 3,792,841, to Karl G. Munters, discloses a "Contact Apparatus For Liquid and Gas", which includes a contact body having first and second sets of corrugated sheets arranged with the sheets of the first set disposed alternately with the sheets of the second set. The sheet corrugations provide channels or passageways which penetrate the contact body from edge to edge, with both the horizontal and vertical components thereof defining a fluted configuration. Another fluid contact device is disclosed in U.S. Pat. No. 3,704,869, to Ronald Priestley and includes packing sheets characterized by spaced, parallel units, each of which units defines a sector of a hollow, corrugated tube connected by planer portions of the sheets, the assembled sheets providing a regular array of hollow corrugated tubes. U.S. Pat. No. 2,977,103 to L. R. Smith et, al., discloses a "Cooling Tower Structure", which includes a rectangular, box-like container that is open at the top, the sides and bottom of which container are formed of U-shaped wire members positioned by cooperating longitudinal wires. Solid metal sheets define the ends of the container and cooling plates or baffles are placed in the frame in parallel, spaced relationship to achieve the desired fluid contact. U.S. Pat. No. 4,031,180, entitled "Cooling Pad System", discloses a cooling system which uses wafered panels to create an evaporate cooling surface for cooling a building. U.S. Pat. No. 4,389,352, entitled "Cooling Pad Support System", teaches a support apparatus for mounting a cooling system such as the system disclosed in U.S. Pat. No. 4,031,180, on the wall of a building. Other patents which disclose liquid contact apparatus of various design for creating mass transfer and evaporative cooling surfaces are as follows: U.S. Pat. No. 1,142,809, to J. F. Grace, entitled "Cooling Tower"; U.S. Pat. No. 2,665,123, to D. D. Foster, et al. entitled "Apparatus For Treating Gases With Liquids"; U.S. Pat. No. 2,961,226, to A. B. Goettle, entitled "Evaporative Cooler and Water Control Means Therefor"; U.S. Pat. No. 3,208,204, to Per-Oskar Persson, entitled "Eliminator For Separation of Liquid From Gas"; U.S. Pat. No. 3,965,691, to Van Huis, entitled "Cooling System For Poultry Houses"; U.S. Pat. No. 4,312,819, to Billy M. Leyland, entitled "Air Cooling Apparatus", and U.S. Pat. No. 4,477,394, to Charles M. Armstrong and Eddie D. Duke entitled "Fluid Contact Panel."

One of the problems realized in prior art cooling systems and particularly in systems utilizing evaporation cooling in cooperation with one or more exhaust fans, is that of providing a desired degree of cooling inside the structure as the temperature outside the structure rises. For example, on spring or fall days when the outside temperature is not extremely high, less cooling is necessary in the structure than under circumstances where the temperature is very high, such as during mid-summer. Furthermore, introduction of distributing of water into the cooling pads or panels in such a manner as to completely saturate the panels instead of causing the water to "channel" through the panels and leave dry areas in the panels, is difficult.

Another problem associated with many of the prior art liquid-gas interface structures is the relatively great weight of such devices and particularly those structures which are constructed of metal and wood. Another problem is the lack of sufficient contact surface and voids, a condition which frequently results in excessive pressure drop across the cooling matrix itself. Still another problem which is particularly apparent in poultry houses, where water should not be introduced into the house by means of the cooling system, is that of entrained water which is introduced into the house with the air which circulates through the cooling system. Since poultry and particularly chickens, are highly susceptible to disease when wet, the introduction of such entrained water with the air is highly undesirable.

Accordingly, it is an object of this invention to provide a new and improved medium for effecting efficient cooling contact between air and water, which medium is characterized by a high percentage of voids, minimum pressure drop in the air phase, reduction of channeling of the downward flowing water and a large surface area for effecting good interface contact between the air and water.

Another object of the invention is to provide a new and improved, extended surface contact apparatus having multiple vertically, horizontally, and diagonally oriented fins arranged in a repeating array or matrix for use in cooling air by using a downward flow of water through the apparatus, with air circulated through the matrix transversely to the water flow, which apparatus is characterized by good resistance to corrosion, lightness of weight and a high percentage of voids to wettable contact surface area, the surface area further designed and oriented in a matrix to minimize channeling of the liquid and maximize deposition of a film of water on the contact surfaces to maximize air-water contact efficiency.

Yet another object of this invention is to provide new and improved fluid contact plates which are substantially inert and are capable of assembly into an interlocking extended surface matrix for interface contact between water and air, which plate are each characterized by multiple vertically, horizontally and diagonally oriented fins arranged in a matrix array and provided with projecting pins and internal pin slots, with accompanying T-connectors and T-slots for connecting the plates in front-to-back and stacked relationship, which plates are light in weight, resistance to corrosion and can be utilized in many air cooling and mass transfer applications.

Another object of this invention is to provide a new and improved cooling fluid contact plate apparatus for use in structures such as greenhouses and poultry houses, which apparatus is designed to facilitate efficient air-water contact by presenting an extended surface cooling film matrix characterized by multiple fins and utilizing one or more screens which are designed to minimize the introduction of water into the structure as liquid droplets entrained in the air stream.

Another object of the invention is to provide a new and improved fluid contact plate cooling apparatus for use in cooperation with exhaust fans to cool such structures as greenhouses, poultry houses and the like, which apparatus is characterized by multiple fluid contact plates joined in front-to-back relationship by means of pins and cooperating pin slots and vertically attached to T-connectors and corresponding T-slots, to provide a cooling surface of desired thickness and height. Each of the plates includes multiple vertically, horizontally and diagonally positioned fins organized in a repeating matrix, with a screen or screens of selected mesh size located in the matrix structure, in order to provide maximum efficiency in contacting air with water flowing through the matrix structure, to cool the air and the poultry house, greenhouse or other structure.

SUMMARY OF THE INVENTION

These and other objects of the invention are provided in a new and improved extended surface fluid contact plate matrix shaped from individual fluid contact plates, which matrix is characterized by strength, lightness of weight, a high percentage of voids and efficient spacial orientation to maximize filming and reduce the channeling and air-entrainment of water flowing through the matrix. The fluid contact plate matrix also realizes good efficiency in contacting the water film with air drawn through the matrix perpendicular to the matrix plane, to effect interaction between the air and liquid to cool the air. In a preferred embodiment of the invention the fluid contact plates are each characterized by vertically, horizontally and diagonally oriented fins joined at junction areas to create a contact matrix, with projecting pins extending in spaced relationship from selected areas oriented on the face of the plates. Corresponding receiving slots are provided at selected junction areas located on the back of the plates, for receiving the pins in order to facilitate multiple thicknesses of the plates. T-connectors are located at the top of each of the plates and corresponding T-slots are located at the bottom of the plates for stacking the plates in vertically staggered relationship and facilitating arrangement of the stacked plates in rows, in order to provide an extended surface cooling matrix of selected size and thickness for a specific application.

BRIEF DESCRIPTION OF THE DRAWING

The invention will be better understood by reference to the accompanying drawing, wherein:

FIG. 1 is a front elevation of a preferred embodiment of the fluid contact plate of this invention;

FIG. 2 is an enlarged view, partially in section, of a portion of the fluid contact plate illustrated in FIG. 1;

FIG. 3 is an enlarged sectional view of a portion of the fluid contact plate illustrated in FIG. 1;

FIG. 4 is a top end view, partially in section, of the fluid contact plate illustrated in FIG. 1; and FIG. 5 is a sectional view of three fluid contact plates arranged in spaced, front-to-back relationship, illustrating joining of the plate together to create a fluid contact plate matrix of selected thickness.

DESCRIPTION OF THE PREFERRED EMBODIMENTS

Referring initially to FIGS. 1-3 of the drawing, in a preferred embodiment the fluid contact plate of this invention is generally illustrated by reference numeral 1. The fluid contact plate 1 is characterized by a substantially square plate structure having a plate face 2 and a plate back 24, which structure includes spaced, parallel, vertical fins 3, spaced, parallel, horizontal fins 4 and two sets of spaced, diagonal fins 14, which intersect the vertical fins 3 and horizontal fins 4 at the junctions 22, respectively. A top border member 5 defines the top perimeter element of the fluid contact plate 1, while side border members 9 define the side perimeter elements and the bottom border member 10 defines the bottom perimeter element of the fluid contact plate 1, as illustrated. A pair of T-connectors 6 project from the top border member 5 of the fluid contact plate 1, as illustrated in FIG. 2 and each T-connector 6 is characterized by a stem 8, which is attached to or formed integrally with the top border member 5, and a cap 7 terminating the stem 8. A pair of cooperating T-slots 11 are provided in spaced relationship in the bottom border member 10 of the plate structure 2 and as further illustrated in FIG. 2, each of the T-slots 11 is further characterized by a stem opening 13 and a corresponding cap opening 12, for receiving the stem 8 and cap 7, respectively, of the T-connectors 6, in order to join multiple units of the fluid contact plate 1 in vertical, end-to-end, stacked relationship, as hereinafter described. In a most preferred embodiment of the invention the diagonal fins 14, which are located in the matrix created by the vertical fins 3 and the horizontal fins 4, are wider than the vertical fins 3 and horizontal fins 4, as illustrated in FIG. 3, in order to present additional contact surface for interface between the air and the water flowing across the fluid contact plate 1 from the top border member 5 to the bottom border member 10.

As particularly illustrated in FIG. 3 of the drawing, four pins 15 project in spaced relationship from selected locations between the junctions 22 in the plate face 2 of the fluid contact plate 1 and extend outwardly of the plane of the diagonal fins 14. In a most preferred embodiment, each of the pins 15 is characterized by an elongated pin shaft 18, which is provided with a pin shoulder 16 and terminates in a smaller pin tip 17, for purposes which will be more particularly hereinafter described. Multiple pin shaft openings 19 are also provided in selected ones of the junctions 22 in the plate back 24 behind the junction openings 23 and are designed to receive the respective corresponding pin shafts 18 and pin tips 17 of the pins 15. The pin tips 17 extend through the junction openings 23, provided at the base of each of the pin shaft openings 19, when the pin shafts 18 and pin tips 17 are inserted in corresponding pin shaft openings 19. In a most preferred embodiment of the invention the pin shaft openings 19 are vertically staggered below the pins 15 in each of the fluid contact plates 1, to facilitate joining of the fluid contact plates 1 in front-to-back, vertically staggered relationship, as illustrated in FIG. 5.

Referring now to FIGS. 1 and 5 of the drawing it will be appreciated that multiple fluid contact plates 1 can be joined in front-to-back, vertically staggered relationship by aligning the pins 15 extending from the respective plate faces 2 of selected fluid contact plates 1 with the corresponding pin shaft openings 19, provided behind and connecting with selected ones of the junction openings 23 in the plate back 24 of other fluid contact plates 1. This alignment is made such that the pin shafts 18 and pin tips 17 are inserted in corresponding pin shaft openings 19, respectively, until the respective pin tips 17 project through corresponding junction openings 23 in the pin shaft openings 19. The respective fluid contact plates 1 are illustrated in spaced relationship in FIG. 5 for purposes of clarity to more particularly illustrate the connection between adjacent plates, whereas in reality, the adjacent fluid contact plate 1 will be pressed against each other, front-to-back, as the pins 15 are inserted in the corresponding pin shaft openings 19. A heated tool such as a soldering or welding gun (not illustrated) is then inserted in the junction openings 23 which correspond to the pin shaft openings 19, against the projecting pin tips 17, to weld the ends of the pin tips 17 to the respective vertical fins 3, horizontal fins 4 and diagonal fins 14 surrounding the junction openings 23, respectively. Accordingly, it will be appreciated from a consideration of FIG. 5 that multiple units of the fluid contact plate 1 can be joined in vertically staggered, front-to-back relationship utilizing the respective pins 15 and pin shaft openings 19 to create a fluid contact plate matrix of desired thickness in order to effect the desired cooling function. In another most preferred embodiment of the invention this vertical stagger is equal to the width of the parallel horizontal fins 4, as further illustrated in FIG. 5.

Referring again to FIGS. 1, 2, 4 and 5 of the drawing, the multiple fluid contact plates 1 can also be joined in stacked, end-to-end relationship as heretofore described, by engaging the caps 7 and stems 8 of each respective T-connector 6 to corresponding cap openings 12 and stem openings 13, respectively, in the T-slots 11 of an adjacent fluid contact plate 1, to create a fluid contact plate matrix of desired area.

In another most preferred embodiment of the invention a screen 21 is provided in the structure of the fluid contact plate 1 as illustrated in FIG. 1 and the screen 21 serves to partially block each of the triangular-shaped openings in the fluid contact plate 1 defined by the vertical fins 3, horizontal fins 4 and diagonal fins 14. It will be appreciated by those skilled in the art that the mesh size of the screen 21 can be chosen to produce a desired reduction in entrainment of water in the air flowing transversely through the fluid contact plate 1 when water is caused to flow by gravity from top to bottom of the fluid contact plate 1 in the cooling procedure. Furthermore, more than one screen 21 can be provided in cooperation with the vertical fins 3, horizontal fins 4 and diagonal fins 14 as necessary, in order to prevent or at least minimize, this entrainment of water in the air flow.

It will be appreciated by those skilled in the art that the fluid contact plates of this invention are most preferably shaped by injection molding certain plastic materials such as polyethelene and polypropylene into the configuration illustrated in the drawing. These materials are highly resistant to corrosion, will not deteriorate upon contact with water and air and are capable of withstanding significant mechanical stresses which are imposed when multiple units of the fluid contact plate 1 are joined in front-to-back orientation to increase the thickness of the desired cooling matrix and/or the height of the matrix. Furthermore, referring again to FIG. 5 of the drawing, when the fluid contact plates 1 are joined as illustrated, the top, bottom or both lapped segments of each extending fluid contact plate 1 can be easily cut with a saw and the projecting pins 15 and T-connectors 6 clipped, to custom fit the resulting fluid contact plate matrix into a specific installation. The vertical fins 3, horizontal fins 4, diagonal fins 14, pins 15 and T-connectors 6 are tapered and shaped according to molding requirements which are well known to those skilled in the art, in order to easily remove each fluid contact plate 1 from a mold of appropriate design.

It will be further appreciated by those skilled in the art that multiple units of the fluid contact plate 1 of this invention can be assembled and utilized in poultry houses where a 2 to 4-inch thick fluid contact plate matrix is normally required; in cooling towers, where an approximately 12-inch or thicker matrix structure is usually required; and in other industrial activities such as sewer treatment plants, as well as scrubbing and other mass transfer operations, all of which require an extended contact matrix of various thickness and area. The fluid contact plate 1 of this invention is also particularly well suited for cooling greenhouses designed to grow a wide variety of plants, including flowers and vegetables such as tomatoes.

As heretofore described, in a most preferred embodiment of the invention each of the fluid contact plates 1 is approximately 12 inches square, such that six of the fluid contact plates 1 stacked in vertically staggered orientation as illustrated in FIG. 5, will provide about 72 inches of stacked height. Furthermore, when constructed of a plastic material such as injection-molded polyethelene or polypropylene, each of the 12 inch square fluid contact plates 1 weight about 4½ ounces, under circumstances where the plate is one-half of an inch thick measured across the diagonal fins 14. Since all plastic material such as polyethelene and polypropylene tend to "bead" moisture when wet, in yet another preferred embodiment of the invention an antibeading agent is used in the plastic during the molding phase. It is also preferable to incorporate an ultraviolet ray (UV) stabilizer to minimize degredation of the finished fluid contact plate product by the sun.

Referring again to FIGS. 1 and 2 of the drawing it will be appreciated that each of the fluid contact plates 1 are symmetrical about the vertical center line thereof, which symmetry eliminates the problem of warping due to heat absorption and cooling at different rates. Furthermore, it will also be appreciated that as the water flows from a substantially equal distribution along the top border member 5 downwardly across and through the matrix defined by the fluid contact plate 1, the water must change direction at each of the junctions 22 because of the spacial orientation of the vertical fins 3, horizontal fins 4 and diagonal fins 14. This multiple change in water direction creates a more efficient filming of the water on the vertical fins 3, horizontal fins 4 and diagonal fins 14 and tends to interrupt the water flow and create multiple, tortous flow paths for the water across the matrix, to eliminate channeling of water across the fluid contact plate 1. The creation of a high percentage of wettable surface area and yet an acceptable void area in each fluid contact plate 1 presents a matrix having a highly efficient, extended contact surface for interfacing the air and water and cooling the air without excessive entraining of water in the air as the air flows transversely through the triangular-shaped voids in the fluid contact plate 1. The entrainment of water in the air is further effectively minimized or eliminated by the screen 21 or by multiple screens 21 of varying mesh size, the number of screens and screen mesh size of which are chosen according to the specific installation required.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A plurality of fluid contact plates, each of said fluid contact plates comprising a first array of vertical fins provided in spaced relationship; a second array of horizontal fins provided in spaced relationship with respect to each other, said horizontal fins intersecting said vertical fins, respectively; a first plurality of diagonal fins positioned in spaced relationship with respect to each other, said first plurality of diagonal fins intersecting said vertical fins and said horizontal fins in angular relationship to define a plurality of discreet junctions, respectively; a second plurality of diagonal fins positioned in spaced relationship with respect to each other, said second plurality of diagonal fins intersecting said first plurality of diagonal fins, said vertical fins and said horizontal fins in angular relationship at said junctions, respectively, said vertical fins, said horizontal fins and said diagonal fins defining a front matrix surface and a back matrix surface in said fluid contact plate; front connecting means provided in said front matrix surface and back connecting means provided in said back matrix surface, said front connecting means adapted to engage said back connecting means for joining first selected ones of said fluid contact plate to each other in front-to-back relationship, said plurality of fluid contact plates joined in vertical, abutting, assembled relationship to define an assembly, with means to pass liquid vertically down through the assembly and means to pass air horizontally therethrough.

2. The fluid contact plates of claim 1 further comprising at least one screen located between said front matrix surface and said back matrix surface of each of said plates.

3. The fluid contact plate of claim 1 wherein said front connecting means and said back connecting means are vertically staggered with respect to each other in each of said fluid contact plates, whereby said first selected ones of said fluid contact plates are connected in vertically non-aligned relationship.

4. The fluid contact plates of claim 1 wherein said front connecting means further comprises at least one pin projecting from said front matrix surface and said back connecting means further comprises at least one pin opening provided in said back matrix surface, said pin opening adapted to receive said pin and connect said first selected ones of said fluid contact plates in front-to-back relationship.

5. The fluid contact plate of claim 4 further comprising a pin shoulder provided on said pin, an elongated pin tip projecting from said pin shoulder and an enlarged junction opening provided in said pin opening for receiving said pin tip and securing said pin in said pin opening.

6. The fluid contact plate of claim 1 further comprising two connecting means provided in the top of each of said fluid contact plates and bottom connecting means provided on the bottom of each of said fluid contact plates, said top connecting means engaging said bottom connecting means for joining selected ones of said fluid contact plates to each other in stacked relationship.

7. The fluid contact plates of claim 6 wherein:
(a) said first connecting means further comprises at least one pin projecting from said front matrix surface and said back connecting means further comprises at least one pin opening provided in said back matrix surface, said pin opening adapted to receive said pin and connect said first selected ones of said fluid contact plates in front-to-back relationship; and
(b) said top connecting means further comprises at least one generally T-shaped connector projecting from said top of each of said fluid contact plates and said bottom connecting means further comprises at least one generally T-shaped slot provided in said bottom of each of said fluid contact plates, said T-shaped slot adapted to receive said T-shaped connector and connect said second selected ones of said fluid contact plates in top-to-bottom, stacked relationship.

8. The fluid contact plates of claim 6 wherein said top connecting means further comprises at least one generally T-shaped connector projecting from said top of each of said fluid contact plates and said bottom connecting means further comprises at least on generally T-shaped slot provided in said bottom of each of said fluid contact plates, said T-shaped slot adapted to receive said T-shaped connector and connect said second selected ones of said fluid contact plates in top-to-bottom, stacked relationship.

9. The fluid contact plates of claim 6 further comprising at least one screen having a selected mesh size located between said front matrix surface and said back matrix surface and wherein:
(a) said front connecting means further comprises at least one pin projecting from said front matrix surface and said back connecting means further comprises at least one pin opening provided in said back matrix surface, said pin opening adapted to receive said pin and connect said first selected ones of said fluid contact plates in front-to-back relationship; and
(b) said top connecting means further comprises at least one generally T-shaped connector projecting from said top of each of said fluid contact plates and said bottom connecting means further comprises at least one generally T-shaped slot provided in said bottom of each of said fluid contact plates, said T-shaped slot adapted to receive said T-shaped connector and connect said second selected ones of said fluid contact plates in top-to-bottom, stacked relationship.

* * * * *